US007385780B2

(12) United States Patent
Kim et al.

(10) Patent No.: US 7,385,780 B2
(45) Date of Patent: Jun. 10, 2008

(54) ONLINE IDENTIFICATION OF SECONDARY ACTUATOR TRANSFER FUNCTION VIA SYSTEM DECOUPLING IN MULTIPLE-STAGE ACTUATOR SERVO SYSTEMS IN DISK DRIVES

(75) Inventors: Young Hoon Kim, Cupertino, CA (US); Sang Hoon Chu, San Jose, CA (US); Dong-Jun Lee, Sunnyvale, CA (US); Hyung Jai Lee, Cupertino, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 11/580,635

(22) Filed: Oct. 12, 2006

(65) Prior Publication Data

US 2008/0088965 A1 Apr. 17, 2008

(51) Int. Cl.
*G11B 5/596* (2006.01)
*G11B 21/10* (2006.01)

(52) U.S. Cl. .................................... 360/78.05; 360/75

(58) Field of Classification Search ..................... None
See application file for complete search history.

(56) References Cited

U.S. PATENT DOCUMENTS 6,546,296 B1 * 4/2003 Hara .......................... 360/69
7,079,338 B1 * 7/2006 Semba et al. ................. 360/75
7,079,339 B1 * 7/2006 Semba et al. ................. 360/75
7,136,257 B2 * 11/2006 Zhang et al. ........... 360/78.05
7,265,936 B1 * 9/2007 Lee et al. ................ 360/78.05
7,283,321 B1 * 10/2007 Sun et al. ................ 360/78.05
2007/0223136 A1 * 9/2007 Hutsell .................... 360/78.05
2007/0253097 A1 * 11/2007 Sun et al. ................ 360/78.04

FOREIGN PATENT DOCUMENTS

JP 2000182340 A * 6/2000

* cited by examiner

*Primary Examiner*—Hoa T. Nguyen
*Assistant Examiner*—James L Habermehl
(74) *Attorney, Agent, or Firm*—Ben J. Yorks; Irell & Manella LLP

(57) ABSTRACT

A hard disk drive that includes a voice coil motor and a micro-actuator. The micro-actuator is controlled by a servo that utilizes a micro-actuator controller and a corresponding micro-actuator transfer function. The servo enters a mode to self-determine at least one transfer function coefficient of the micro-actuator controller.

10 Claims, 5 Drawing Sheets

18
16
-12-
14
10
20
44
3
28
26
42
30
36
38
32
34
40

24
22
44
20

(CONTROLLER)
DSP
READ DATA
WRITE DATA
-64-
MEMORY
-76-
RG
66
68
WG
70
72
READ / WRITE
CHANNEL
-58-
MOTOR
CONTROL
-74-
-50-
READ DATA
54
60
READ/WRITE
ENABLE
WRITE DATA
56
PREAMP
-52-
VOICE COIL MOTOR
POSITION CONTROL
ROTATION CONTROL
POSITION CONTROL
MICRO-ACTUATOR
20
20
20
20
14
12
12

ONLINE IDENTIFICATION OF SECONDARY ACTUATOR TRANSFER FUNCTION VIA SYSTEM DECOUPLING IN MULTIPLE-STAGE ACTUATOR SERVO SYSTEMS IN DISK DRIVES

BACKGROUND OF THE INVENTION

1. Field of the Invention

The present invention relates to a servo routine of a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Information is typically stored in radial tracks that extend across the surface of each disk. Each track is typically divided into a number of segments or sectors. The voice coil motor and actuator arm can move the heads to different tracks of the disks.

FIG. 1 shows a typical track that has a number of fields associated with each sector. A sector may include an automatic gain control ("AGC") field 1 that is used to adjust the strength of the read signal, a sync field 2 to establish a timing reference for the circuits of the drive, and ID 3 and Gray Code 4 fields to provide sector and track identification.

Each sector may have also a servo field 5 located adjacent to a data field 6. The servo field 5 contains a plurality of servo bits A, B, C and D that are read and utilized in a servo routine to position the head 7 relative to the track. By way of example, the servo routine may utilize the algorithm of ((A−B)−(C−D)) to create a position error signal ("PES"). The PES is used to create a drive signal for the voice coil motor to position the head on the track.

Some disk drives contain a micro-actuator that can provide micro-control of the head position. For hard drives with a micro-actuator the servo will have three loops. A loop for the voice coil motor, a loop for the micro-actuator and an overall loop for the system.

Each servo loop has a corresponding transfer function. For example, the voice coil motor loop has a transfer function and the micro-actuator has a transfer function. Each transfer function can typically be defined by the following equation:

$$y_m = A[\lambda\cos((2\pi/N)k)+\beta\sin((2\pi/N)k)] \quad (1)$$

where $\lambda$ and $\beta$ are coefficients that contain the magnitude and phase of the transfer function.

The transfer function of a micro-actuator may vary from part to part. Additionally, the transfer function may vary with temperature and time. It is therefore desirable to determine the transfer function of the micro-actuator.

One way to obtain the transfer function of the micro-actuator is determine the transfer function of the voice coil motor and the overall transfer function of the servo system and then calculate the micro-actuator transfer function using the overall and voice coil motor transfer function. This approach can lead to inaccurate results. It would be desirable to more accurately determine the transfer function of a micro-actuator.

BRIEF SUMMARY OF THE INVENTION

A hard disk drive that contains a voice coil motor and a micro-actuator. The hard disk drive includes a servo circuit that self-determines at least one transfer function coefficient of a micro-actuator controller.

DETAILED DESCRIPTION

Described is a hard disk drive that includes a voice coil motor and a micro-actuator. The micro-actuator is controlled by a servo that utilizes a micro-actuator controller and a corresponding micro-actuator transfer function. The servo enters a mode to self-determine at least one transfer function coefficient of the micro-actuator controller.

Figure 2:
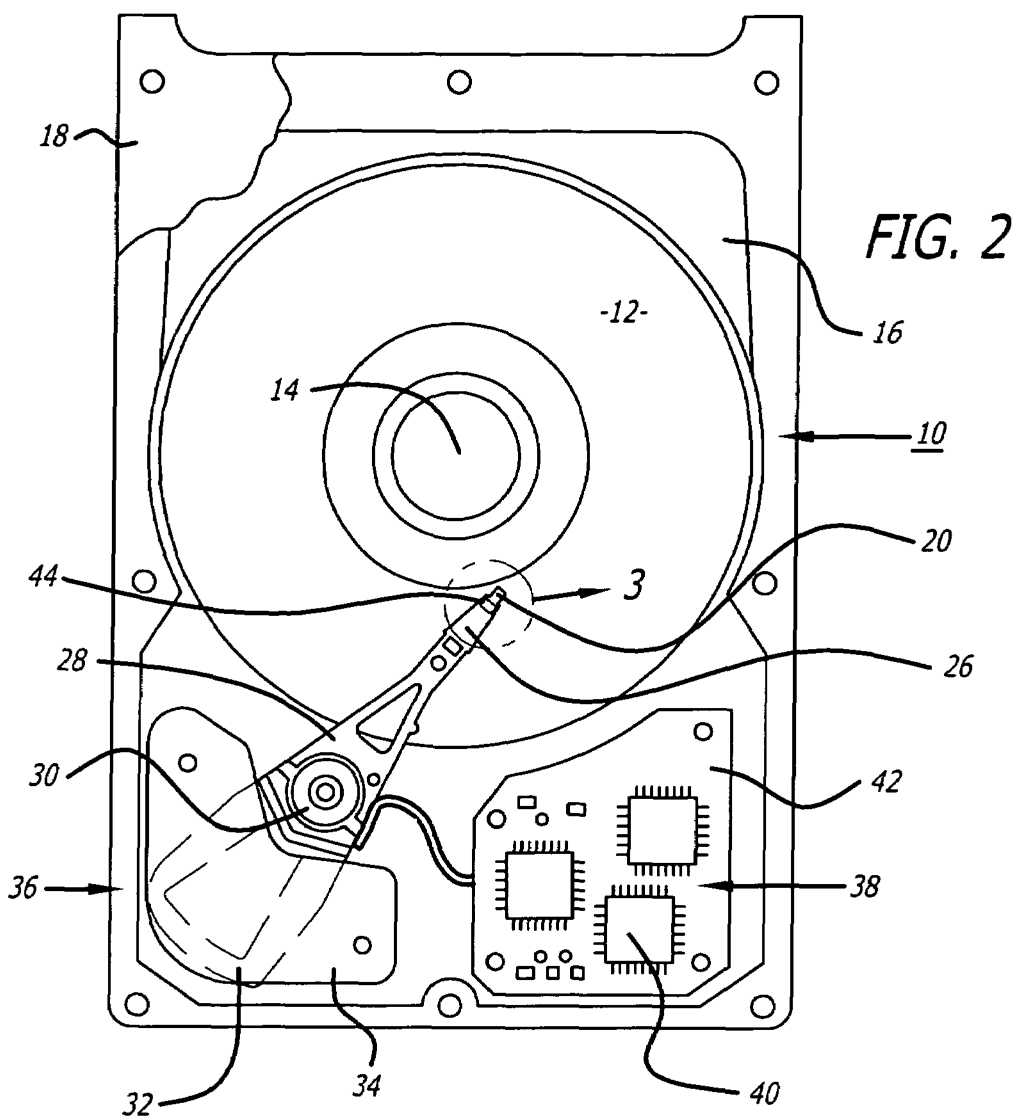
FIG. 2 is a top view of an embodiment of a hard disk drive.

Referring to the drawings more particularly by reference numbers, FIG. 2 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 3:
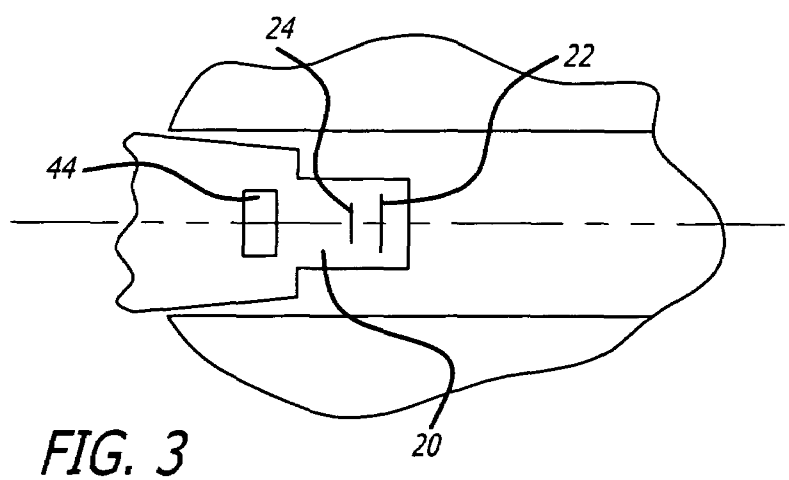
FIG. 3 is a top enlarged view of a head of the hard disk drive.

The disk drive 10 may include a plurality of heads 20 located adjacent to the disks 12. As shown in FIG. 3 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux.

Referring to FIG. 2, each head 20 may be gimbal mounted to a suspension arm 26 as part of a head gimbal assembly (HGA). The suspension arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes one or more integrated circuits 40 coupled to a printed circuit board 42. The printed circuit board 40 is coupled to the voice coil 32, heads 20 and spindle motor 14 by wires (not shown).

The hard disk drive may include one or more micro-actuators 44 that are coupled to the suspension arms 26 and heads 20. By way of example, the micro-actuators 44 may include piezoelectric elements. The micro-actuators 44 can provide fine movement of the heads 20.

Figure 4:
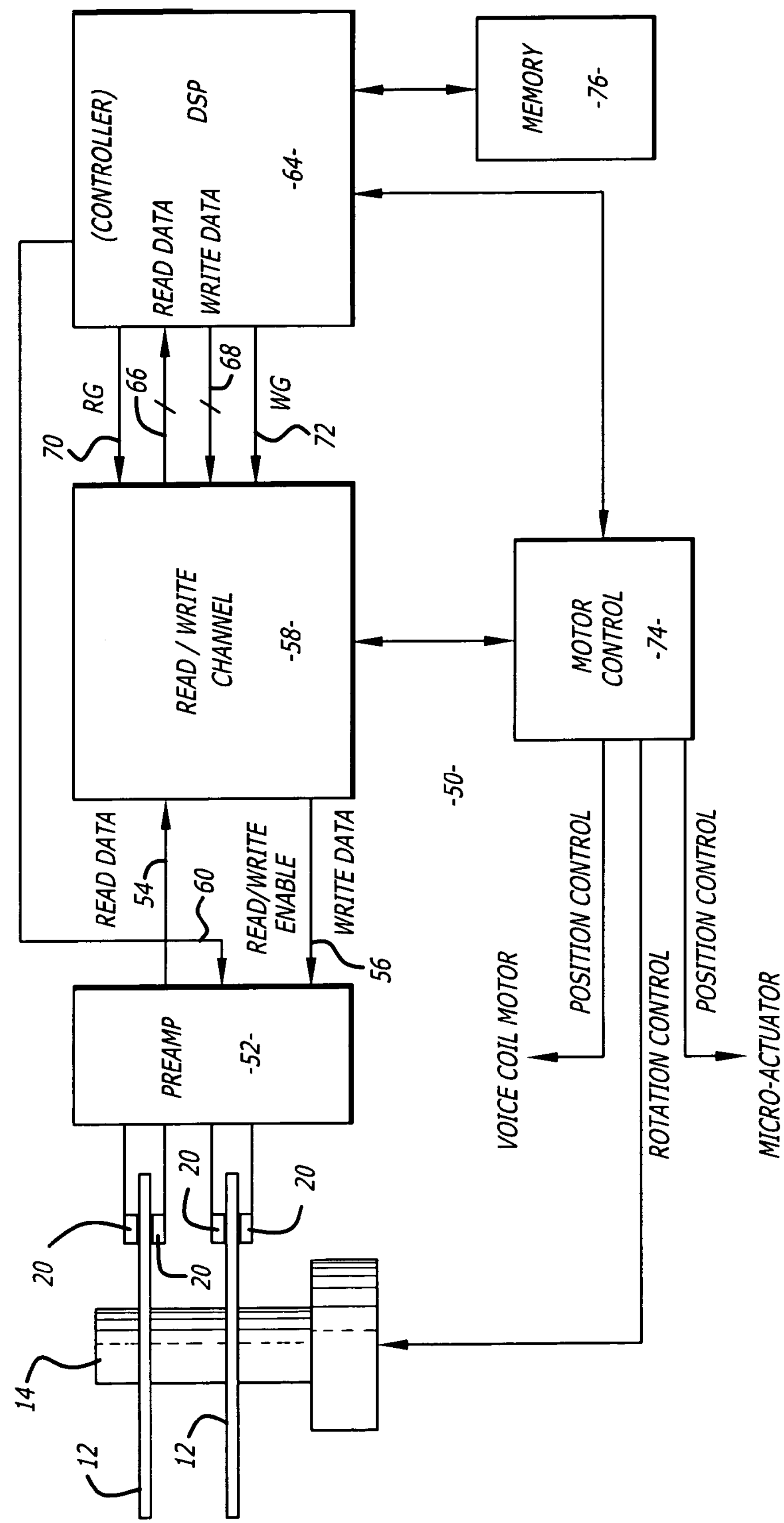
FIG. 4 is a schematic of an electrical circuit for the hard disk drive.

FIG. 4 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 58 is connected to a controller 64 through read and write channels 66 and 68, respectively, and read and write gates 70 and 72, respectively. The read gate 70 is enabled when data is to be read from the disks 12. The write gate 72 is enabled when writing data to the disks 12. The controller 64 may be a digital signal processor that operates in accordance with a software routine, including a routine(s) to write and read data from the disks 12. The read/write channel circuit 58 and controller 64 may also be connected to a motor control circuit 74 which controls the voice coil motor 36, spindle motor 14 and micro-actuator 44 of the disk drive 10. The controller 64 may be connected to a non-volatile memory device 76. By way of example, the device 76 may be a read only memory ("ROM") that contains instructions that are read by the controller 64.

Figure 1:
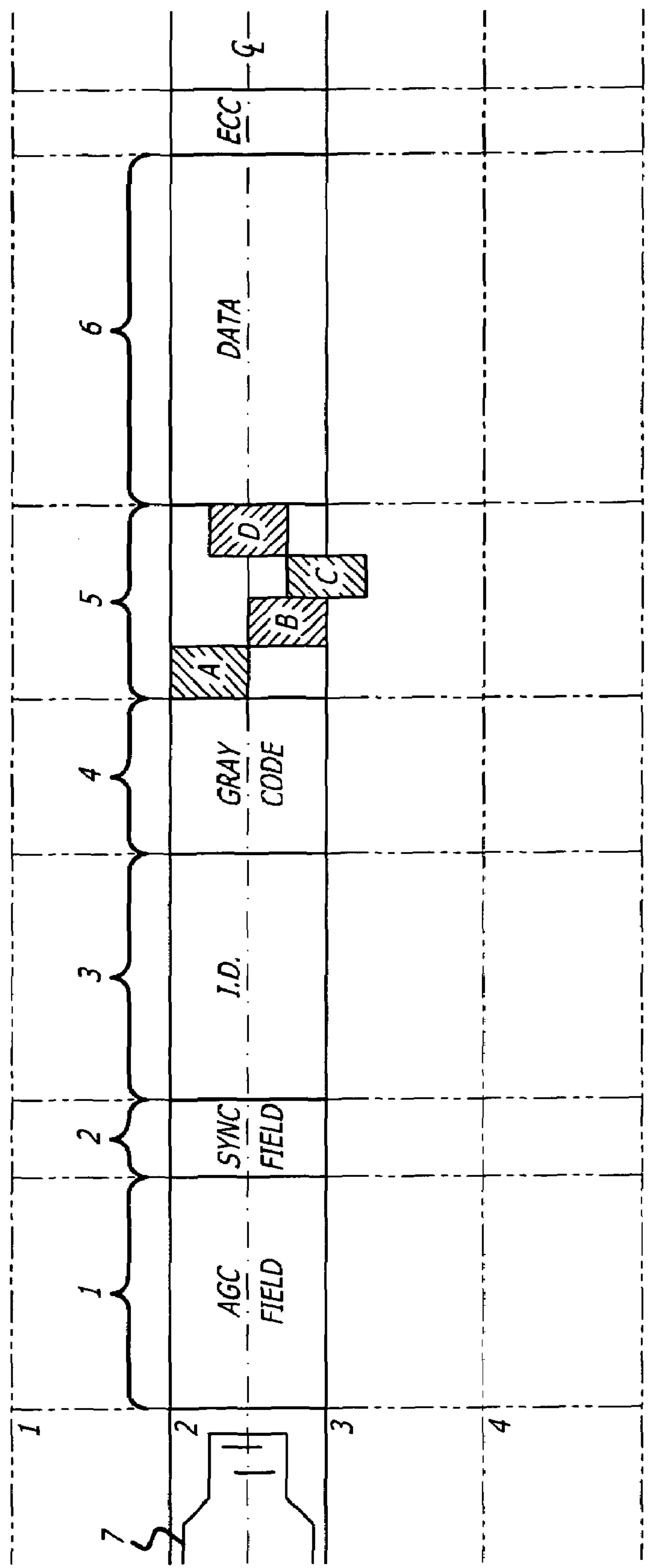
FIG. 1 is an illustration of a track of the prior art.

Each sector of a disk track typically has servo bits A, B, C and D as shown in FIG. 1. The controller 64 may operate a servo routine utilizing the servo bits to position the head relative to the track. The head is moved in accordance with a position error signal ("PES"). The PES reflects the difference between a target position and the actual position of the head.

Figure 5:
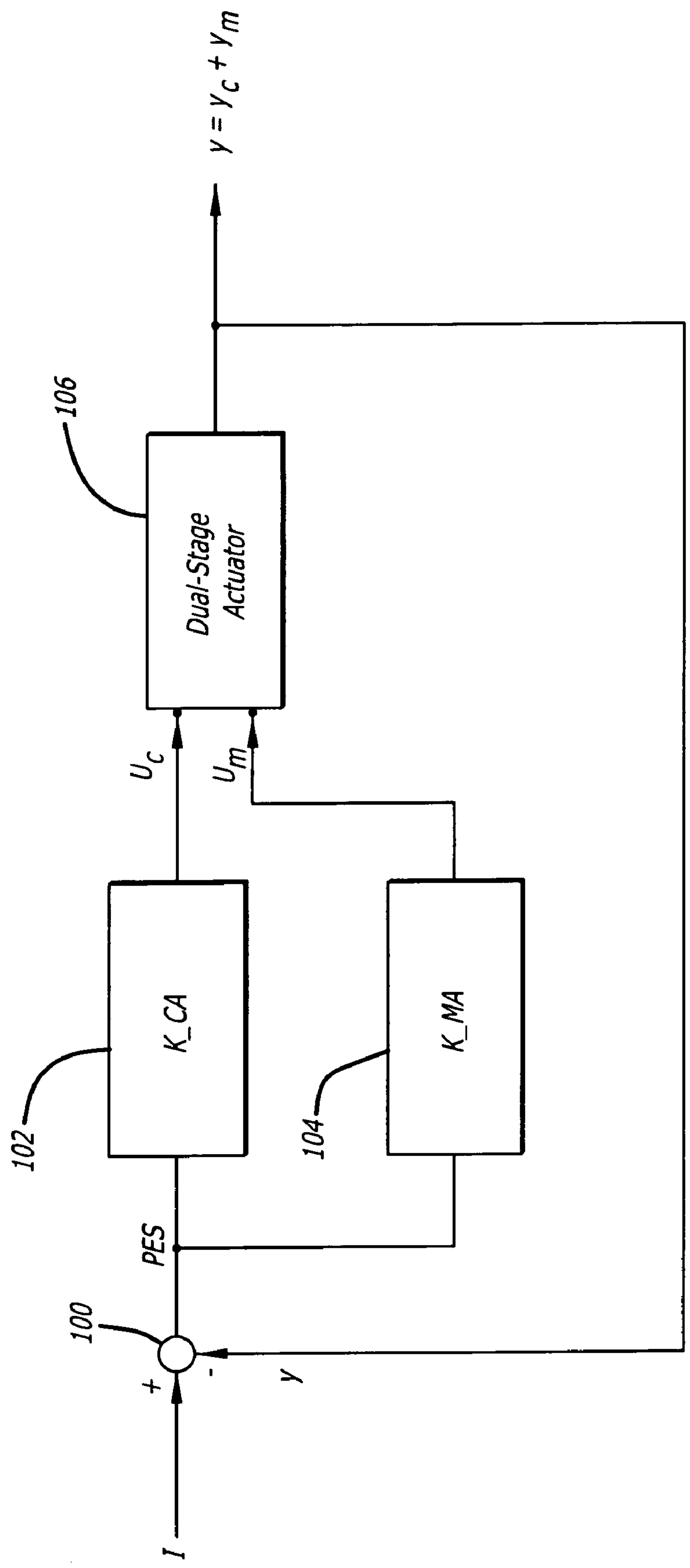
FIG. 5 is a schematic of a servo for the hard disk drive.

FIG. 5 shows a schematic of a servo used to position a head relative to a track of a disk. The servo is typically performed by the controller 64 of the drive. The servo includes an adder 100 that combines an input signal I with a measured position signal y. The input signal typically corresponds to the ideal position of a head. The output signal y corresponds to the actual position of the head. The output of the adder 100 is a position error signal ("PES").

The position error signal is provided to a voice coil motor controller 102 and a micro-actuator controller 104. The controllers 102 and 104 generate output signals $u_c$ and $u_m$ that are provided to the voice coil motor and micro-actuator illustrated as a dual actuator stage 106. The output y contains components relating to the movement of the voice coil motor $y_c$ and micro-actuator $y_m$.

The output of the micro-actuator can be defined by the following equation:

$$y_m = A[\lambda \cos((2\pi/N)k) + \beta \sin((2\pi/N)k)] \quad (2)$$

where;

A=amplitude.

λ=transfer function coefficient.

β=transfer function coefficient.

The transfer function coefficients may vary between heads. Additionally, the coefficients may change with temperature and time. It is therefore desirable to periodically update the transfer function coefficients. This can be done for example, during an idle mode of the disk drive.

Figure 6:
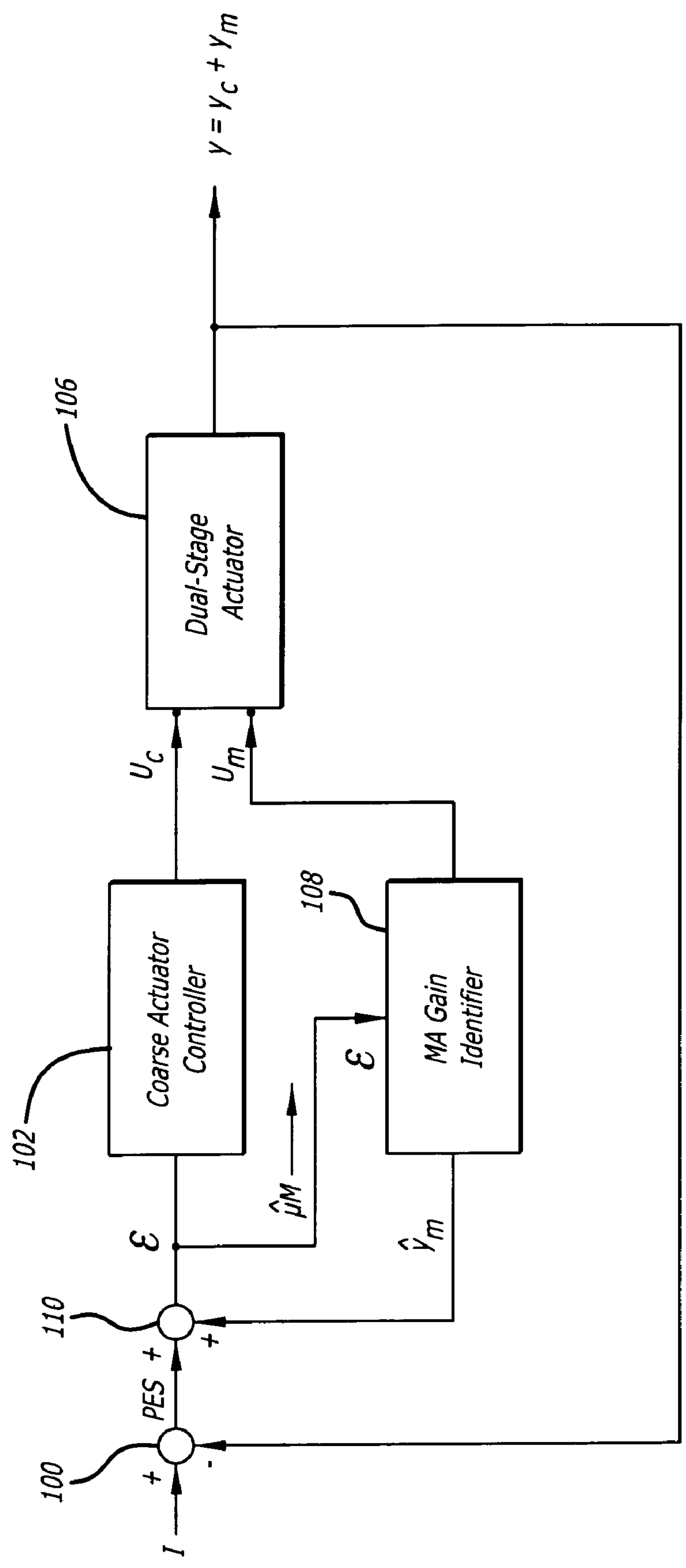
FIG. 6 is a schematic of the servo in a gain identification mode.

FIG. 6 shows the servo when the system enters a gain identification mode to update the coefficients. The micro-actuator controller becomes a micro-actuator gain identifier 108 with an output $\hat{y}_m$ provided to an adder 110. The adder 110 combines the output $\hat{y}_m$ with the PES signal to create a signal $\epsilon$ that is fed back into the gain identifier 108.

The output signal $\hat{y}_m$ can be defined by the equation:

$$\hat{y}_m[k] = \hat{a}[k] \cos((2\pi/N)k) + \hat{b}(k)\sin((2\pi/N)k)] \quad (3)$$

It can be seen by inspection that equation (3) is similar in form with equation (2) where â[k] corresponds to λ and $\hat{b}$[k] corresponds to β.

â[k] and $\hat{b}$[k] can be defined by the following estimating equations:

$$\hat{a}[k] = \hat{a}[k] + g\epsilon \cos((2\pi/N)k) \quad (4)$$

$$\hat{b}[k] = \hat{b}[k] + g\epsilon \sin((2\pi/N)k) \quad (5)$$

where;

g=a known gain value which is a negative number.

$\epsilon$=is the output of adder 110.

k=an increment of time.

An excitation signal having the following equation can be provided to the system:

$$u_m = A \cos((2\pi/N)k) \quad (6)$$

The excitation signal is fed through the feedback loop of the gain identifier 108 and the adder 110. When the error function $\epsilon$ goes to zero in the feedback loop the sine and cosine terms in equations (4) and (5), respectively, go to essentially zero. At this point â[k] and $\hat{b}$[k] are essentially constant and approximate the transfer function coefficients λ and β, respectively. The transfer function coefficients λ and β are then stored and used in the servo system shown in FIG. 5.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A hard disk drive, comprising:

a disk;

a head coupled to said disk;

an actuator arm coupled to said head;

a micro-actuator coupled to said head;

a voice coil motor actuator coupled to said actuator arm; and, a servo circuit coupled to said voice coil motor and said micro-actuator, said servo circuit performing a servo that includes a voice coil motor controller and a micro-actuator controller, said servo circuit enters a mode to self-determine at least one transfer function coefficient of said micro-actuator controller, said transfer function coefficient is determined by inputting an excitation signal to said micro-actuator controller and an output of said micro-actuator controller is added to a position error signal to create a feedback signal that is inputted to said micro-actuator controller.

2. The hard disk drive of claim 1, wherein said micro-actuator controller includes a micro-actuator gain identifier that computes said transfer function coefficients in accordance with the following equations:

$$\hat{y}_m[k] = \hat{a}[k] \cos((2\pi/N)k) + \hat{b}[k] \sin((2\pi/N)k)]$$

$$\hat{a}[k] = \hat{a}[k] + g\epsilon \cos((2\pi/N)k)$$

$$\hat{b}[k] = \hat{b}[k] + g\epsilon \sin((2\pi/N)k)$$

where â[k] and $\hat{b}$[k] approximate transfer function coefficients.

3. The hard disk drive of claim 1, wherein said excitation signal has a sinusoidal waveform.

4. The hard disk drive of claim 1, wherein said transfer function coefficients are used to control said micro-actuator.

5. The hard disk drive of claim 1, wherein said servo circuit includes a controller.

6. A hard disk drive, comprising:

a disk;

a head coupled to said disk;

an actuator arm coupled to said head;

a micro-actuator coupled to said head;

a voice coil motor actuator coupled to said actuator arm; and, means for performing a servo.

7. A method for identifying at least one transfer function coefficient used to control a micro-actuator of a hard disk drive, comprising:

inputting an excitation signal to a micro-actuator controller;

generating an output from the micro-actuator controller;

combining the output with a position error signal to create a feedback signal that is fed back into the micro-actuator controller; and, determining at least one transfer function coefficient from the outer signal.

8. The hard disk drive of claim 7, wherein said micro-actuator controller includes a micro-actuator gain identifier that computes said transfer function coefficients in accordance with the following equations:

$$\hat{y}_m[k]=\hat{a}[k]\cos((2\pi/N)k)+\hat{b}[k]\sin((2\pi/N)k)]$$

$$\hat{a}[k]=\hat{a}[k]+g\epsilon\cos((2\pi/N)k)$$

$$\hat{b}[k]=\hat{b}[k]+g\epsilon\sin((2\pi/N)k)$$

where â[k] and $\hat{b}$[k] approximate transfer function coefficients.

9. The hard disk drive of claim 7, wherein said excitation signal has a sinusoidal waveform.

10. The hard disk drive of claim 6, wherein said transfer function coefficients are used to control said micro-actuator.

* * * * *